April 12, 1955     A. J. KLOSE     2,705,890
FLUID STREAM SPEED AND DIRECTION PICKUP
Filed March 20, 1952     2 Sheets-Sheet 1
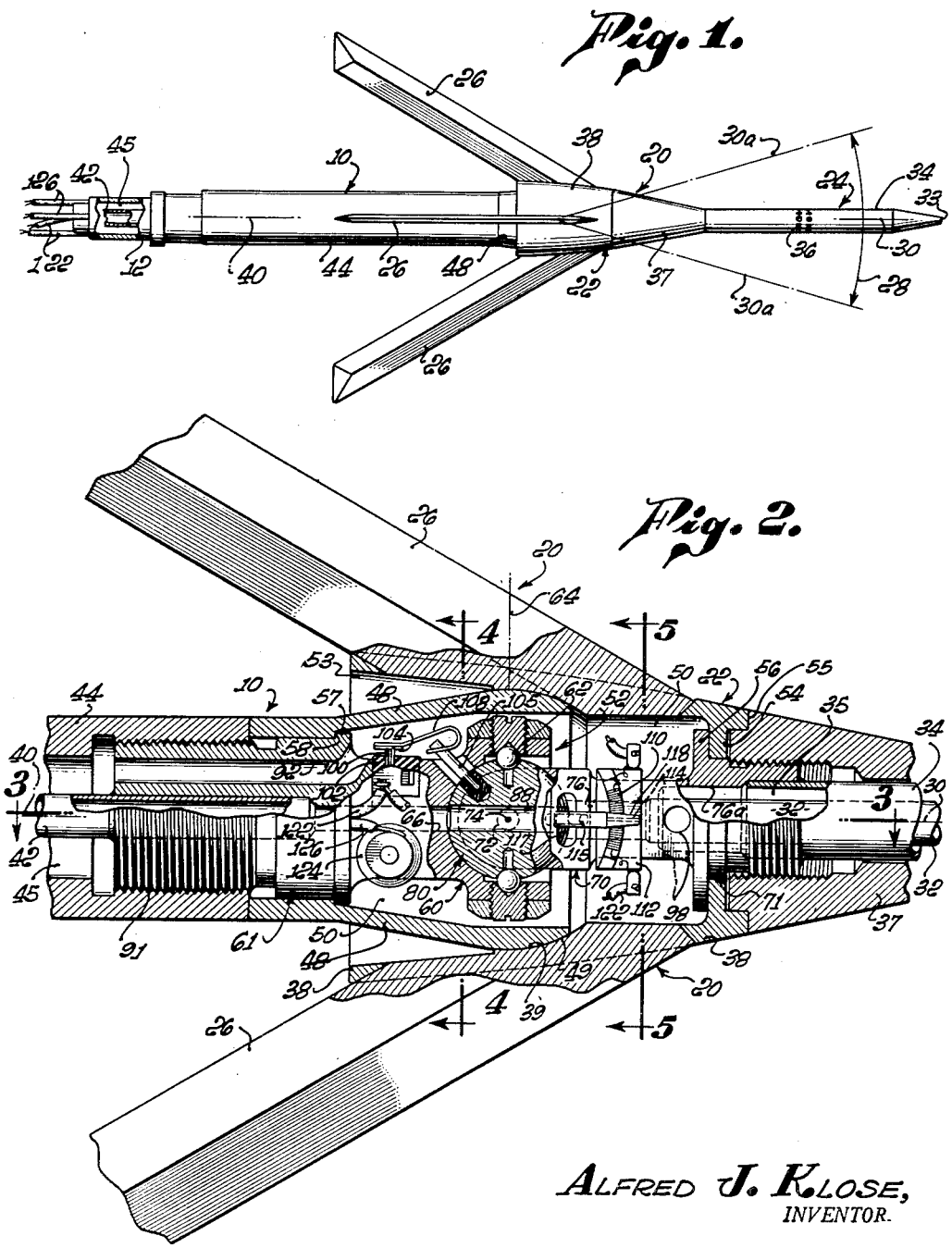
ALFRED J. KLOSE,
INVENTOR.
BY
Bartelow & Scantlebury
ATTORNEYS.

April 12, 1955 A. J. KLOSE 2,705,890
FLUID STREAM SPEED AND DIRECTION PICKUP
Filed March 20, 1952 2 Sheets-Sheet 2
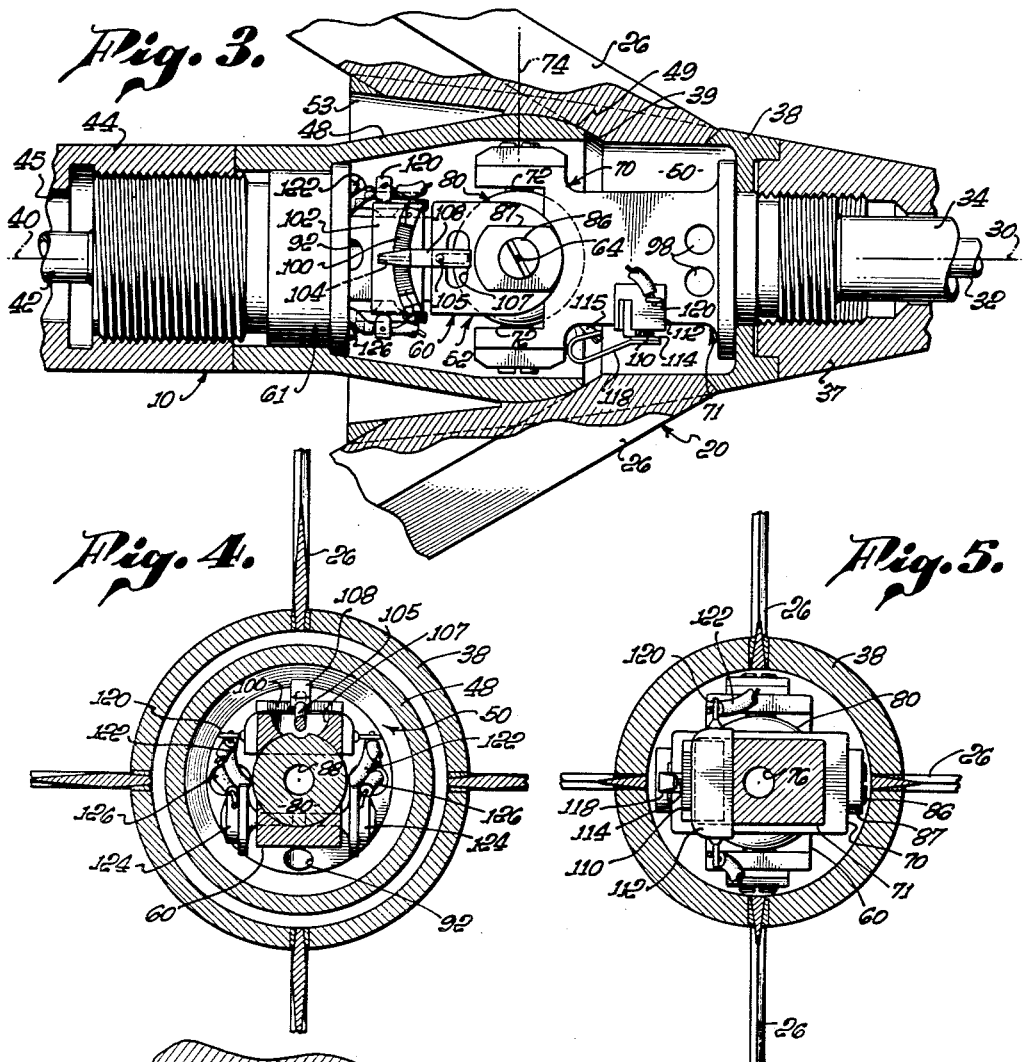
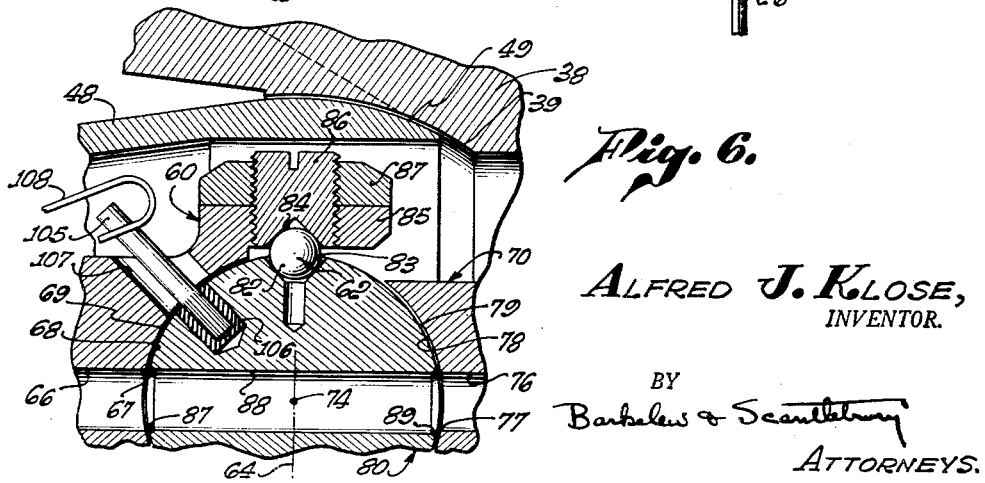
ALFRED J. KLOSE,
INVENTOR.
BY Barkelew & Scanlebury
ATTORNEYS.

United States Patent Office 2,705,890
Patented Apr. 12, 1955

2,705,890

FLUID STREAM SPEED AND DIRECTION PICKUP

Alfred J. Klose, Rolling Hills, Calif., assignor to G. M. Giannini & Co. Inc., Pasadena, Calif., a corporation of New York Application March 20, 1952, Serial No. 277,677

10 Claims. (Cl. 73—189)

This invention is concerned generally with the problem of indicating or measuring the speed and direction of a fluid stream. A typical example of that problem has to do with indicating movement of the atmosphere relative to a vehicle such as an aircraft. For the sake of clarity, the invention will be described with particular reference to that illustrative problem.

The measurement or indication of a variable physical quantity, such as the speed or direction of movement of the atmosphere past an aircraft, ordinarily comprises a sensing mechanism that is responsive to the quantity to be measured or indicated and that generates a signal corresponding to the magnitude of that quantity; a receiving device for measuring or indicating the signal, and means for transmitting the signal from the sensing mechanism to the receiving device.

One aspect of the present invention is concerned primarily with providing sensing mechanisms that are responsive to the speed and the direction of a fluid stream, such as an airstream, at substantially one and the same definite and well defined portion of that stream; and that cause by their presence a minimum disturbance of the stream that is to be measured.

In the illustrative instance of a stream-sensing mechanism for a high speed aircraft, it is desirable that the mechanism be exposed to a portion of the airstream that is substantially undisturbed by the mass of the aircraft itself. One such position is ahead of and directly on the longitudinal axis of the aircraft. For optimum utilization of such a favorable position of installation, it is highly advantageous that the speed sensing mechanism and the direction sensing mechanism be arranged along a common axis as close together as possible. At the same time, neither mechanism should appreciably disturb the airstream to which the other is exposed; and the combined disturbance produced by both mechanisms in the airstream that flows over the body of the aircraft should be an absolute minimum.

In accordance with the present invention it is possible to construct speed and direction sensing mechanisms that are responsive to substantially identical portions of an airstream. Moreover, the speed sensing mechanism may be arranged directly in advance of the direction sensing mechanism along an axis that points accurately upstream. With that arrangement, and with the speed sensing mechanism of a form that is accurately symmetrical about that flow axis, as in the preferred form of the invention, the direction sensing mechanism is exposed to a portion of the stream which is entirely undisturbed as to its direction by presence of the speed sensing mechanism.

That particularly favorable arrangement of the two types of sensing mechanism is made possible by a coordinated structural relation between them. A single assembly, comprising support, pivotally mounted head and vanes for alining the head with the airstream, performs the dual functions of supporting the speed sensing mechanism in alinement with the airstream and of generating mechanical angular movement that corresponds to variations of the airstream direction with respect to the support. That mechanical angular movement is utilized in turn to generate an angle-representing signal of any desired type for transmission to an indicating or measuring instrument.

An illustrative type of speed sensing mechanism in accordance with the invention is a combination pitot and static pressure pickup, preferably comprising a pitot tube, extending forwardly along the axis of the pivoted head, and a static tube coaxially surrounding the pitot tube in spaced relation. The invention includes novel structure by which passages are provided for conveying the generated pitot and static pressures through the pivotal mounting of the head without introducing any appreciable frictional or resilient restraints between the head and the support.

An illustrative type of direction sensing mechanism, in combination with the pivoted and aerodynamically oriented head already mentioned, comprises means for generating an electrical signal representative of the angular movement of the head with respect to the support. Two distinct signals may be generated, representing respective components of that movement in mutually perpendicular planes parallel to the direction of stream flow. A preferred type of signal generating means utilizes a potentiometer coil and contacting brush that are linked mechanically or otherwise to the relative angular movement of the head and support in such a way that the brush moves axially over the coil in response to that angular movement.

A full understanding of the invention, and of its further objects and advantages, will be had from the following description, of which the accompanying drawings are a part. That description relates specifically to a typical preferred embodiment of the invention in a combined speed and direction sensing mechanism that is responsive to a fluid stream of the type produced by movement of an aircraft through the atmosphere. The particulars of the described structure are intended only as illustration of the invention and not as limitations upon its scope, which is defined in the appended claims.

In the drawings:

Fig. 1 is a plan of an illustrative embodiment of the invention;

Fig. 2 is a fragmentary axial section, in the same aspect as Fig. 1 and at enlarged scale;

Fig. 3 is a fragmentary axial section on line 3—3 of Fig. 2;

Figs. 4 and 5 are transverse sections on lines 4—4 and 5—5, respectively, of Fig. 2; and Fig. 6 is a partly schematic representation of a portion of Fig. 2 at further enlarged scale.

As shown illustratively in the drawings, a support, typically in the form of an elongated mast, carries at its forward end a head assembly 20, comprising a head body 22 with forwardly projecting tube assembly 24 and a plurality of vanes 26 which are mounted directly on head body 22 and extend outwardly and rearwardly in a manner adapted to maintain head 20 in alinement with a stream of air that passes over the instrument from right to left as seen in Fig. 1. Head 20 is mounted on support 10 for universal pivotal movement through a limited range of angles, as indicated schematically by the arrow 28 in Fig. 1. In normal position of the instrument, as illustrated in the figures, the longitudinal axis 30 of head 20 is directly alined with the longitudinal axis 40 of mast 10. In its extreme positions of angular deflection, head 20 may lie with its axis in such positions as are indicated at 30a.

At the rearward end of support 10 is a fitting 12 by which the support may be rigidly mounted, as on an aircraft. Although support 10 appears in Fig. 1 as a straight mast, a form which is ordinarily preferred, that particular representation is not intended as a limitation upon the shape of the support. If the outward form of support 10 does not uniquely define the direction of its longitudinal axis 40, that axis may be considered as the projection of head axis 30 when the instrument is in normal position.

Tube assembly 24 of head 20 comprises an inner pitot tube 32 and a static tube 34, coaxially surrounding pitot tube 32 in spaced relation. The forward end of pitot tube 32 is somewhat tapered and is open at 33 to receive air under ram pressure, thereby generating within the tube a signal pressure which varies with the velocity of the air stream longitudinally of the tube. The annular passage 35 between the pitot and static tubes is closed at its forward end, but is open to the atmosphere through a plurality of relatively small radial apertures 36, arranged circumferentially of the tube approximately midway of its length, which admit to passage 35 a signal pressure substantially independent of the stream velocity. The pitot and static pressures may be utilized in known manner to indicate the magnitude of the stream velocity.

Support 10 is provided with two longitudinal passageways. In the form illustrated an inner tube 42 is coaxial with support axis 40 and provides a passage through which the pressure signal from pitot tube 32 is transmitted. The outer shell 44, which forms also the structural body of support 10, is coaxially spaced from tube 42, providing an annular passage 45 through which the pressure signal from static tube 34 is transmitted. Passage 45 also accommodates electrical connections to be described.

In the particular embodiment illustrated, support 10 and head 20 are positively related by a universal joint 52, which comprises a support yoke 60, formed at the forward end of the yoke member 61, which is threaded into support tube 44 coaxially with axis 40; a head yoke 70, formed at the rearward end of yoke member 71, which is threaded into the tapered sleeve 37 coaxially with flow axis 30; and a pivot member 80, typically of spherical shape. Pivot bearings 62 are provided between support yoke 60 and pivot member 80, permitting limited relative rotation of those elements about a support pivot axis 64 that perpendicularly intersects support axis 40 at the center of curvature of support shell surface 49. Pivot bearings 72 similarly connect head yoke 70 and pivot member 80 for limited relative rotation about a head pivot axis 74 that perpendicularly intersects flow axis 30 at the center of curvature of head shell surface 39. Pivot bearings 62 and 72 are so positioned on the pivot member that pivot axes 64 and 74 intersect perpendicularly at the center of curvature of the spherical pivot member, and the bearings are adjusted axially so that support axis 40 and flow axis 30 intersect in that same point. The head is thereby positively related to the support for limited universal rotation about the point defined by the intersection of the two pivot axes 64 and 74.

A preferred type of pivot bearing, best illustrated in Fig. 6, comprises a ball 82 that is received in a countersunk radial bore 83 in pivot member 80 and in an opposing conical recess 84 provided in the yoke arm 85. As shown, recess 84 is formed in the inner end face of a screw 86, adjustably threaded in yoke 85 on the pivot axis and locked in adjusted position as by a lock nut 87.

The main body of head 20 includes a head shell 38, which is coaxial with flow axis 30 and is longitudinally slotted to receive the inner ends of vanes 26. Each vane preferably comprises an elongated unitary structural element of uniform flat cross section. The vanes extend laterally from shell 38 and are swept back like the wings of a high speed aircraft, preferably forming with flow axis 30 an acute angle that is less than 45°. Shell 38 is provided at its forward end with an inner flange 54 and an end flange 55 that directly engages tapered sleeve 37. Shell 38 and sleeve 37 are clamped together in rigid and accurately defined relation by flange 56 of yoke member 71, which engages the rearward face of shell flange 54. The vanes, as illustrated, are preferably fitted in their slots in shell 38 and rigidly secured in position, as by welding, before the inner surface of the shell is finished. Enough material is removed in that finishing to produce a smooth interior face. That face includes a concave spherical portion 39, the center of curvature of which lies accurately on flow axis 30.

A support shell 48 is rigidly mounted at the forward end of support 10 coaxially with support axis 40. Shell 48 is held in abutting relation with the forward end of support tube 44 by circumferential flange 57 of yoke member 61, the rearward face of which engages the internal shoulder 58 of shell 48. That shell is provided near its forward end with a convex spherical surface 49 that mates flexibly with concave surface 39 of head shell 38. Together, the two shells 38 and 48 comprise an articulated housing that spacedly encloses the universal joint structure 52, already described, forming a chamber 50 that is typically generally annular in form.

An articulated conduit for transmission of the pitot signal pressure between pitot tube 32 and inner support tube 42 is provided along the longitudinal axis of the universal joint. The detailed structure of that conduit may be varied in accordance with the structure of the universal joint itself. A particularly effective manner of providing such a conduit in connetcion with the present preferred form of universal joint is shown illustratively, and includes an axial passageway 66 in support yoke 60, a corresponding axial passageway 76 in head yoke 70, and a passageway 88 through the body of pivot member 80. Passageway 66 comprises an axial bore through yoke member 61, counterbored at its rearward end to receive the forward end of inner tube 42, which may be soldered in place. Passageway 76 comprises an axial bore through yoke member 71. Bore 76 is suitably formed at its forward end to receive the rearward ends of pitot tube 32 and static tube 34, as indicated in Fig. 2.

In addition, an articulated conduit is provided for conduction of the static signal pressure from the annular passage 35 within the static tube past universal joint 52 to passage 45 in the support. That conduit includes the chamber 50, already described. Connection from annular static chamber 35 to chamber 50 is made via the enlarged portion 76a of bore 76 and radial passages 98 in the base of yoke 70. Connection from chamber 50 to annular passage 45 in support 10 is made via a plurality of passages 92 formed in support yoke member 61 generally parallel to support axis 40 and forming an annular array surrounding that axis.

Passageway 66 terminates at its forward end in a port 67 (Fig. 6) that lies within a concave surface of revolution 68 about support pivot axis 64. In the particular present embodiment, surface 68 is a spherical surface having its center of curvature at the intersection of pivot axis 64 and support axis 40. Passageway 76 terminates at its rearward end in a port 77 that lies within a concave surface of revolution 78 about head pivot axis 74, that surface in the present instance being spherical and concentric about the intersection of pivot axis 74 and flow axis 30.

Pivot member 80 is provided with a convex surface of revolution 69, coaxial with pivot axis 64 and facing and closely spaced from concave surface 68, already described; and with a convex surface of revolution 79, coaxial with pivot axis 74 and facing and closely spaced from concave surface 78. Passageway 88 terminates at its rearward end in a port 87 within the surface 69, and at its forward end in a port 89 within the surface 79. In the present embodiment the two surfaces 69 and 79 are concentric spherical surfaces of equal curvature, and comprise the surface of the ball from which the pivot member is formed. Passageway 88 comprises a diametral bore of that ball.

In normal position of head 20, as illustrated, ports 87 and 89 of the pivot member are substantially directly opposed to ports 67 and 77, respectively, in the support and head yokes. The ports are sufficiently large that, even at maximum angular deflection of head 20, an adequate passage for fluid flow remains open between bores 66 and 76. Moreover, whatever portion of a port is shifted out of line with the opposite port by rotation of the head is covered by the curved surface that surrounds the opposite port.

The radii of curvature of the concave surfaces 68 and 78 are substantially equal, and exceed the radius of the ball by a very small distance, which is preferably less than one thousandth of an inch, and may be as little as 0.0003 inch. That distance is, nevertheless, sufficient to prevent appreciable physical contact between the opposing surfaces of each pair 68, 69 and 78, 79. In accordance with the invention, those surfaces are preferably kept free of any lubricant, which might stiffen at low temperatures, nor is any other sealing means provided, such as might completely stop air flow between them. It is preferred, instead, to avoid any mechanical friction, even such as would be produced by a film of grease, and rely entirely upon an accurately spaced fit of the opposing faces to reduce the air leakage between passageway 66, 88, 76 and chamber 50 to a value that is of negligible practical effect. That is done by sufficiently close spacing of the opposing faces, combined with sufficient accuracy of the parts to prevent actual contact between those faces.

Spherical surfaces 39 and 49, already described, on head shell 38 and support shell 48, respectively, are mutually concentric about the intersection of pivot axes 64 and 74. That relation can be obtained conveniently, in association with the typical pivot mechanism already described, from location of the center of curvature of surface 49 at the intersection of support axis 40 and support pivot axis 64; and location of the center of curvature of surface 39 at the intersection of flow axis 30 and head pivot axis 74. The sum of the angular extents of the two surfaces 39 and 49 in an axial plane (axis 30 or 40) is appreciably greater than the total angular amplitude of the head in its limited movement in that plane. The radius of curvature of convex surface 49 is made slightly smaller than that of concave surface 39 by an amount which just insures physical separation of the two surfaces, while reducing the width of the aperture between them to a value so small that leakage of air between chamber 50 and the surrounding atmosphere may be neglected in practice. In Fig. 6 the widths of the apertures between surfaces 39, 49, surfaces 68, 69 and surfaces 78, 79 are exaggerated for clarity of illustration and to emphasize that, although very small, the clearance in each instance is sufficient to prevent actual mechanical contact between the opposing surfaces.

In actual practice of the invention it is readily possible, without introducing appreciable friction between the mating surfaces, to hold leakage from either articulated conduit within about 3%. With considerable care in lapping the surfaces involved, the leakage may be made less than ½%.

When in operation, the rearward edge of shell 38 produces a subatmospheric pressure in the annular recess 53 into which the aperture between surfaces 39 and 49 opens from chamber 50 and the static signal pressure. Hence the flow through that aperture is always outward to the atmosphere. An advantage of the particular described arrangement of articulated conduits, whereby the static conduit annularly surrounds the higher pressure pitot conduit, is that any leakage out of the static conduit to the atmosphere is substantially compensated by leakage into the static conduit from the pitot conduit.

Turning now to the direction sensing mechanism, two separate and independently operating devices are provided to generate electrical signals corresponding to respective deflections of head 20 about two mutually perpendicular transverse axes. With a universal joint of the present illustrative type, those two axes are preferably the two pivot axes 64 and 74, which, in the present instance are horizontal and vertical, respectively. In an instrument of the present illustrative type those deflections then correspond to pitch and yaw of the aircraft, and the electrical signals may be employed to control instruments for indicating those quantities. Whereas any type of signal generating apparatus may be used that is capable of generating a signal in response to relative angular movement of two members, it is preferred to utilize electrical signals and to generate such signals by movement of a brush along a potentiometer winding.

In that illustrative type of mechanism the brush may be driven with respect to the coil and in response to movement of head 20 by any suitable linkage, mechanical or otherwise. In order to minimize frictional or other reaction upon the members whose relative movement is to be indicated, it is preferred to mount the potentiometer coil directly upon one of the members and the brush directly upon the other, thereby translating relative movement of the members into relative movement of the brush and coil without the interposition of any other moving parts.

In the preferred embodiment shown as an example in the drawings, the vertical deflection signal is derived from relative movement of support 10 and pivot member 80 about support pivot axis 64. A vertical potentiometer coil 100 is mounted in a circularly curved slot in a rectangular block 102 of insulating material, with an edge of the coil projecting above the surface of the block. Block 102 is mounted in a fitting vertical groove cut in the neck of support yoke member 61, in such position that the exposed curved edge of coil 100 describes a circular arc in a plane normal to pivot axis 64 and having its center of curvature in that axis.

A vertical brush 104 is resiliently mounted on pivot member 80 in position to sweep potentiometer coil 100. As shown, a support post 105 is fixed in an insulating bushing 106 (Fig. 6) in a radial bore in pivot member 80, and projects through a clearance slot 107 in one arm of yoke 60. Brush 104 is mounted on post 105 by means of a spring 108, which urges the brush into contact with the potentiometer coil with a uniform but very light pressure. The length of the spring, as illustrated, lies in a plane through pivot axis 64, and is of flat cross section with the relatively large transverse dimension normal to that plane and the relatively small transverse dimension parallel to that plane. Consequently, the spring is relatively soft in the plane of pivot axis 64, providing light brush contact, but is relatively stiff in a plane normal to the pivot axis. Hence the position of brush 104 longitudinally of coil 100 is accurately defined in response to relative rotation of the pivot member and support. So far as rotation about support pivot axis 64 is concerned, pivot member 80 may be considered to be a part of head assembly 20. The voltage picked up by brush 104 represents the angular position of head 20 about axis 64 with respect to support 10.

A horizontal potentiometer coil 110 is correspondingly mounted in a curved slot in insulating block 112, which is set in a horizontal groove in the neck of head yoke member 71. A horizontal brush 114 is mounted on pivot member 80 by means of post 115 and spring 118 in position to sweep the exposed circularly curved edge of coil 110. A clearance slot 117 is provided for post 115 in the upper arm of yoke 70. So far as rotation about head pivot axis 74 is concerned, pivot member 80 may be considered to be a part of support assembly 10. Movement of brush 114 over coil 110 corresponds to the rotary movement of head 20 about pivot axis 74 with respect to support 10.

Electrical connections for providing a suitable voltage across the potentiometer coils and for carrying the signal voltage tapped from the coils by the respective brushes are indicated only partially in the drawings, portions of the leads being omitted for clarity of illustration. The mounting block for each potentiometer coil is provided with two rugged terminal posts 120, set directly in the ends of the block, to which the ends of the coil are connected, and to which power connection may conveniently be made. Power leads, indicated at 122 connect the respective terminals of the two blocks and pass through passages 92 in the body of yoke member 61, then through annular passage 45 of support 10 and through mounting fitting 12. Signal connections, not shown, are made with light flexible wire from the respective brush support posts to insulated terminals 124, set in opposite faces of yoke member 61. Signal leads 126 from terminals 124 are carried beside power leads 122 and are accessible for connection at mounting fitting 12, as indicated in Fig. 1.

The entire head assembly 20 is carefully balanced, with its center of gravity at the intersection of pivot axes 64 and 74. Not only is the frictional restraint of the universal joint very small, but the provision of articulated pressure conduits of the type described avoids any resilient restoring force such as results from conventional types of flexible tubing. Restoring forces of that type ordinarily increase with the angle of deflection, and introduces the possibility of large errors.

Since the speed responsive pickup mechanism is always directly alined with the flow direction, and is symmetrical about that direction, its presence in the stream can cause no error in the response of the direction sensing mechanism. And due to the small size and compact arrangement of the entire instrument, which is outwardly streamlined, a minimum of disturbance is caused in the airstream itself.

I claim:

1. A pitot pressure pickup assembly, comprising a support adapted to be mounted in a fluid stream, a head mounted on the support for limited universal relative rotation, a pitot tube mounted on the head, vane structure mounted on the head in alinement with the pitot tube and adapted to swing the head into alinement with the fluid stream, the mounting of the head on the support comprising a pivot member pivotally connected respectively to the support and to the head for limited relative movement about respective substantially perpendicular pivot axes that are fixed with respect to the support and to the head, respectively, there being concave support and head surfaces of revolution on the support and on the head, respectively, coaxial with the support and head pivot axes, respectively, and two convex surfaces of revolution on the pivot member co-axial with the support and head pivot axes, respectively, and opposite the support and head surfaces, respectively, and radially spaced therefrom by a relatively small distance that is sufficient to prevent physical contact between opposing surfaces, the pivot member having a bore extending between two ports in the respective convex surfaces, structure forming a passage in the head extending between a port in the head surface and the interior of the pitot tube, and structure forming a passage in the support communicating with a port in the support surface, at least a portion of the area of the port in each surface being aligned with the port in the opposite surface and the remainder of that area being covered by the opposite surface for all relative positions of the head with respect to the support.

2. A pitot and static pressure pickup assembly, comprising a support adapted to be mounted in a fluid stream, a head mounted on the support for limited relative universal rotation, pitot and static tubes mounted on the head and extending therefrom in mutually parallel relation, vane structure mounted on the head and adapted to aline the said tubes with the fluid stream, an articulated housing extending between the support and the head and forming a passage for fluid flow therebetween, the said passage communicating with the interior of one of the tubes, a universal joint connecting the head and the support and enclosed within the said articulated housing, and articulated structure forming a second passage for fluid flow between the support and the head, the said second passage communicating with the other tube, the said articulated housing comprising members rigidly mounted respectively on the support and on the head in closely contiguous but positively spaced relation.

3. A pitot and static pressure pickup assembly, comprising a support adapted to be mounted in a fluid stream, a head mounted on the support for limited relative universal rotation, pitot and static tubes mounted on the head and extending therefrom in mutually parallel relation, vane structure mounted on the head and adapted to aline the said tubes with the fluid stream, an articulated housing extending between the support and the head and forming a passage for fluid flow there between, the said passage communicating with the interior of one of the tubes, a universal joint connecting the head and the support and enclosed within the said articulated housing, and articulated structure forming a second passage for fluid flow between the support and the head, the said second passage communicating with the other tube, the articulated structure forming the second passage including a pivot member that is pivotally connected to the support and to the head for relative movement about respective perpendicularly intersecting pivot axes, the said pivot member having a passage that extends radially with respect to both pivot axes and communicates with passages in the head and in the support.

4. A pitot and static pressure pickup assembly, comprising an elongated support adapted to be mounted in a fluid stream with its forward end directed approximately upstream, a head, a universal joint connecting the head and the forward end of the support for limited relative universal rotation, pitot and static tubes mounted on the head and extending therefrom in mutually parallel relation with the pitot tube spaced coaxially within the static tube, vane structure mounted on the head and adapted to aline it with the fluid stream with the tubes extending accurately upstream, the universal joint comprising a support yoke mounted at the forward end of the support and carrying a transverse support pivot axis, a head yoke mounted on the head coaxially with the tubes and carrying a transverse head pivot axis, a pivot member pivotally connected to the support yoke and to the head yoke for limited relative rotation about the respective pivot axes, the said axes intersecting at right angles at an interior point of the pivot member, there being communicating bores in the pivot element and in the respective yokes, the said bores extending radially with respect to the said interior point and providing a path for fluid flow between the two yokes in all angular positions of the yokes with respect to the pivot member and within the extent of limited rotation of the pivot member, a housing enclosing the universal joint and forming therewith a generally annular chamber, the said housing comprising mutually articulated tubular structures mounted respectively on the support and on the head, structure forming respective mutually independent paths for fluid flow between the chamber and the annular space between the two tubes and between the bore in the head yoke and the interior of the pitot tube, and structure forming mutually independent paths for fluid flow longitudinally of the support and in communication respectively with the chamber and with the bore in the support yoke.

5. A pitot and static pressure pickup assembly, comprising a support adapted to be mounted in a fluid stream, a head having a flow axis and mounted on the support for limited relative universal rotation, there being pitot and static pressure apertures in the surface of the head in positions to respond, respectively, to pitot and static pressures corresponding to relative fluid flow parallel to the flow axis, means acting to swing the head with respect to the support to aline the flow axis with the fluid stream, first articulated structure forming a passage for fluid flow between the head and the support and communicating with the pitot aperture in the head, and second articulated structure forming a second passage for fluid flow between the head and the support and communicating with the static aperture in the head, the second said passage being arranged annularly outward of the first, the articulations of the first said articulated structure permitting limited fluid flow outward from the first passage into the second in response to the pressure differential between the relatively higher pitot pressure in the first passage and the relatively lower static pressure in the second passage, and the articulations in the second articulated structure permitting limited fluid flow outward from the second passage to the fluid stream, thereby tending to compensate the fluid flow into the second passage from the first.

6. A pitot and static pressure pickup assembly as defined in claim 5, and in which the articulations of the second mentioned articulated structure open outwardly into the said fluid stream in a rearward direction, whereby the relative movement of the fluid stream tends to draw fluid outwardly through those articulations.

7. A pitot pressure pickup assembly, comprising a support adapted to be mounted in a fluid stream and including a yoke comprising two spaced arms defining a pivot axis in the plane of the yoke, a pivot member mounted between the arms of the yoke for limited relative rotation about the pivot axis, there being a concave surface of revolution on the support between the arms of the yoke and an opposing convex surface of revolution on the pivot member, the said surfaces being coaxial with respect to each other and to the pivot axis, pivot bearings acting between the yoke and the pivot member and maintaining the said surfaces in closely spaced opposing relation, the yoke and the pivot member having bores that terminate in mutually opposed relation in the respective surfaces of revolution, a pitot tube mounted on the pivot member in a plane through the pivot axis and in communication with the bore in the pivot member, and means for swinging the pivot member about the pivot axis to aline the pitot tube with the fluid stream.

8. In a fluid flow and direction pickup, a support having a passage therein and adapted to be mounted in a fluid stream, a head having a flow axis and mounted on the support for relative rotation about a pivot axis that is normal to the flow axis, means acting to swing the head about the pivot axis with respect to the support to aline the flow axis with the fluid stream, a direction pickup comprising relatively movable elements mounted respectively on the support and on the head for mutual rotational movement about the pivot axis, the said elements acting to generate a signal that is responsive to their mutual angular position, there being a passage in the head and an aperture in the surface of the head in communication with the passage and in position to produce in the passage a fluid pressure responsive to a definite pressure condition of fluid flow parallel to the flow axis, an articulated housing forming a chamber and enclosing the said elements of the direction pickup and separating them from the fluid stream, the said housing comprising generally tubular formations rigidly mounted on the support and on the head, respectively, and having respective curved surfaces that are relatively movable in closely adjacent opposed relation in response to relative rotation of the head and the support, the passage in the head and the passage in the support both communicating with the said chamber and forming therewith a continuous path for fluid flow between the aperture and the support.

9. A fluid flow and direction pickup, comprising a support adapted to be mounted in a fluid stream, a head having a flow axis and mounted on the support for limited universal relative rotation, vane structure mounted on the head in alinement with the flow axis and adapted to swing the head with respect to the support to aline the flow axis with the fluid stream, the head comprising a yoke member having a yoke at its rearward end, pitot tube structure at its forward end coaxial with the flow axis, and a forwardly facing annular shoulder forward of the yoke, a head sleeve engaging the said shoulder and spacedly surrounding the yoke, and a retaining member coaxially and removably screwthreaded to the yoke member and acting to clamp the head sleeve against the said shoulder, the sleeve being removable forwardly over the shoulder after removal of the retaining member, the mounting of the head on the support including a pivot member pivotally connected respectively to the support and to the head yoke for limited relative movement about respective substantially perpendicular pivot axes, a tubular formation rigidly mounted on the support and extending into closely spaced relation with the head sleeve and forming therewith a chamber, direction pickup means in the chamber responsive to relative rotation of the pivot member with respect to the head yoke and to the support, and structure providing a continuous path for fluid flow from the pitot tube structure through the chamber to the support.

10. A fluid flow direction pickup, comprising a support adapted to be mounted in a fluid stream, a head mounted on the support for limited universal rotation, means acting to swing the head into alinement with the fluid stream, the mounting of the head on the support comprising respective yokes rigidly mounted on the support and on the head in mutually perpendicular planes and defining respective mutually perpendicular pivot axes, and a pivot member of generally spherical form pivotally connected to the yokes for limited relative rotation about their respective pivot axes, direction responsive means of potentiometer type comprising two brush supports rigidly mounted on the pivot member and extending generally radially therefrom substantially in the planes of the respective yokes, there being clearance openings in the yokes through which the said brush supports project in spaced relation, potentiometer brushes mounted on the projecting portions of the respective brush supports, resistance elements mounted on the first said support and on the head, respectively, adjacent the clearance openings in the yokes and having arcuate contact surfaces that lie in respective planes perpendicular to the two pivot axes in position to be engaged by the said brushes, and means for making electrical connections to the resistance elements and to the brushes.

References Cited in the file of this patent

UNITED STATES PATENTS

| | | |
|---|---|---|
| 1,332,810 | Danielson | Mar. 2, 1920 |
| 2,512,278 | Jones | June 20, 1950 |
| 2,513,390 | Young | July 4, 1950 |
| 2,554,634 | Paine et al. | May 29, 1951 |

FOREIGN PATENTS

| | | |
|---|---|---|
| 610,427 | Great Britain | Oct. 15, 1948 |